United States Patent
Eray

(10) Patent No.: US 8,698,690 B2
(45) Date of Patent: *Apr. 15, 2014

(54) ELECTRONIC ENTITY WITH MAGNETIC ANTENNA

(75) Inventor: Yves Eray, Ouistreham (FR)

(73) Assignee: Oberthur Technologies, Colombes (FR)

( * ) Notice: Subject to any disclaimer, the term of this patent is extended or adjusted under 35 U.S.C. 154(b) by 1277 days.

This patent is subject to a terminal disclaimer.

(21) Appl. No.: 11/920,969

(22) PCT Filed: May 24, 2006

(86) PCT No.: PCT/FR2006/001189
§ 371 (c)(1),
(2), (4) Date: Nov. 23, 2007

(87) PCT Pub. No.: WO2006/125917
PCT Pub. Date: Nov. 30, 2006

(65) Prior Publication Data
US 2009/0040116 A1    Feb. 12, 2009

(30) Foreign Application Priority Data

May 25, 2005    (FR) ..................................... 05 05280

(51) Int. Cl.
*H01Q 7/00* (2006.01)

(52) U.S. Cl.
USPC ........................................................ 343/866

(58) Field of Classification Search
USPC ......... 343/787, 788, 895, 741, 742, 866, 867, 343/873, 795; 340/572.1, 572.7, 572.8
See application file for complete search history.

(56) References Cited

U.S. PATENT DOCUMENTS

| | | | |
|---|---|---|---|
| 6,104,278 A * | 8/2000 | Altwasser | 340/572.1 |
| 6,285,342 B1 * | 9/2001 | Brady et al. | 343/895 |
| 6,774,865 B1 * | 8/2004 | Serra | 343/895 |
| 6,992,630 B2 * | 1/2006 | Parsche | 343/700 MS |
| 7,119,743 B2 | 10/2006 | Iguchi et al. | |
| 2002/0135523 A1 | 9/2002 | Romero et al. | |
| 2003/0019941 A1 | 1/2003 | Altwasser et al. | |
| 2005/0179604 A1 * | 8/2005 | Liu et al. | 343/742 |
| 2006/0050008 A1 | 3/2006 | Morand et al. | |
| 2007/0095913 A1 * | 5/2007 | Takahashi et al. | 235/451 |
| 2007/0271467 A1 | 11/2007 | Ayala et al. | |

FOREIGN PATENT DOCUMENTS

| | | |
|---|---|---|
| DE | 196 10 284 A1 | 8/1997 |
| EP | 0149240 | 7/1985 |
| EP | 886239 | 12/1998 |
| FR | 2724263 | 3/1996 |
| FR | 2769390 | 4/1999 |
| FR | 2812482 | 2/2002 |

(Continued)

OTHER PUBLICATIONS

Chinese Office Action, dated Oct. 17, 2012, from corresponding CN application.

*Primary Examiner* — Robert Karacsony
(74) *Attorney, Agent, or Firm* — Young & Thompson

(57) ABSTRACT

The invention concerns an electronic entity comprising an electronic circuit and an antenna one part of which at least forms a conductive circuit connected to two ends of the electronic circuit. The projection of the circuit formed by the antenna and the electronic circuit in a plane which is substantially parallel thereto, forms an intersection-free line and the antenna includes a winding which extends over strictly more than one turn.

34 Claims, 6 Drawing Sheets

(56) References Cited

FOREIGN PATENT DOCUMENTS

| FR | 2 815 176 A | 4/2002 |
| GB | 2293050 | 3/1996 |
| JP | 8222937 A | 8/1996 |
| WO | 98/08190 | 2/1998 |
| WO | 03/096478 A1 | 11/2003 |
| WO | 2004/109857 A1 | 12/2004 |
| WO | WO2004109852 A1 * | 12/2004 |

* cited by examiner

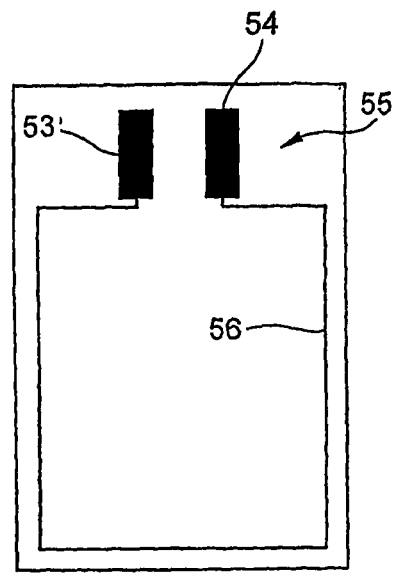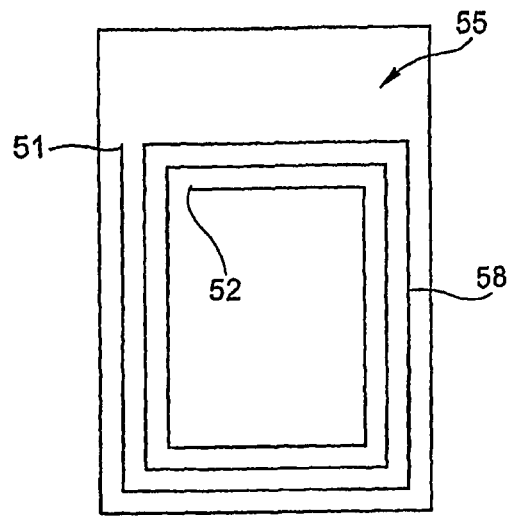
Fig. 5          Fig. 6
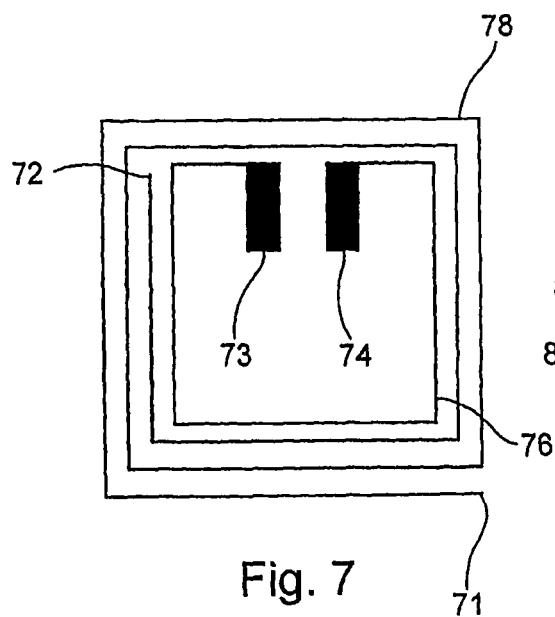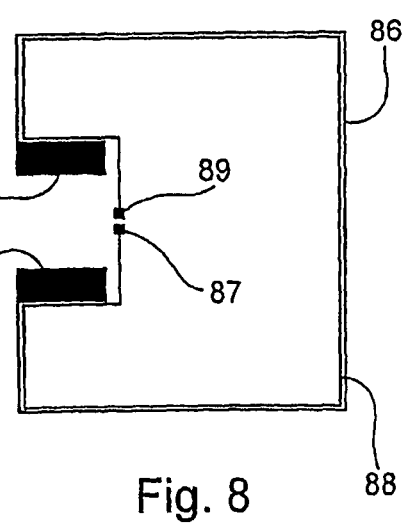
Fig. 7          Fig. 8

ELECTRONIC ENTITY WITH MAGNETIC ANTENNA

The invention concerns an electronic entity with a magnetic antenna.

Electronic entities of this type generally comprise an electronic circuit having in particular two terminals to which is connected a magnetic antenna generally formed of a winding of several turns produced in conductive material.

This type of electronic entity includes in particular contactless microcircuit cards (where the magnetic antenna constitutes the only means of communication of the microcircuit with the exterior) and so-called "dual" or "hybrid" microcircuit cards (where electrical contacts are provided on one face of the card that provide an alternative mode of communication of the microcircuit with the exterior). In microcircuit cards of either type, the turns of the magnetic antenna are generally produced in the form of windings of copper wire or conductive tracks, in both cases disposed within the layers physically constituting the card.

In all cases, to increase the induced current that the magnetic antenna delivers to the electronic circuit, the designer of the electronic entity is constrained to increase the number of turns in order to increase the magnetic flux through the antenna.

Increasing the number of turns rapidly leads to problems, however: on the one hand, the increase of the area that carries the turns relative to the available area can cause problems of congestion, all the more so in that the geometry of the turns is relatively fixed, which is a particular nuisance in the case of electronic entities with small dimensions; on the other hand, the small number of areas generally available to receive the turns (often deposited in the same plane, for example) make bridging techniques necessary for the looping of the electrical circuit, as described for example in patent application FR 2 769 390.

Techniques have been proposed already for simplifying the design or fabrication of the bridge, for example by combining looping and the connection to the electronic circuit, but nevertheless without being able to eliminate as such the necessity of looping the magnetic antenna, but rather by making the design of the electronic entity then proposed complex or too thick.

The invention aims to solve these problems without this compromising the performance of the system and therefore proposes an electronic entity comprising an electronic circuit and an antenna at least a portion of which forms a conductive circuit connected to two ends of the electronic circuit, characterized in that the projection of the circuit formed by the antenna and the electronic circuit in a plane that is substantially parallel to the latter forms a line with no intersections and in that the antenna comprises a winding that extends over strictly more than one turn.

The antenna circuit therefore comprises a winding the performance whereof is better than a single turn, without necessitating the presence of a looping bridge, however.

The winding forms a plurality of turns, for example, in order to obtain particularly good performance.

The winding is included in the conductive circuit, for example.

According to one possible embodiment, the conductive circuit comprises a first strand and a second strand each forming a spiral, the first strand and the second strand being interlaced.

The second strand is essentially parallel at each point to the first strand, for example.

The first strand and the second strand can be separated by a distance of the same order of magnitude over all their length and essentially constant in each direction, for good distribution of the antenna over the electronic entity, for example when it is a question of a card.

In practice, the first strand and the second strand can be separated by at least 8 mm.

According to one possible embodiment, the first strand is connected to a first connection land, the second strand is connected to a second connection land, and the first strand and the second strand are connected by a connecting portion.

At least one of said connecting lands can then be situated in a central region of the antenna, also for good distribution of the antenna over the electronic entity.

The antenna can also comprise a resonator coupled to the electrical conductor in order to improve its performance further.

The electrical conductor can then be formed of a single turn.

The resonator is capacitively coupled to the conductive circuit, for example, for particularly beneficial operation of the antenna, as explained hereinafter.

To this end, the resonator comprises a turn facing the conductive circuit over at least a portion of its perimeter, for example.

To maximize the capacitive coupling, the turn faces the conductive circuit over virtually all its perimeter and/or the turn and the conductive circuits are at a distance less than 0.5 mm over said perimeter portion.

According to one implementation possibility, the resonator is formed of a conductive winding with free ends, and can then comprise a plurality of turns. In this case, in order to obtain a particularly efficient resonator, the turns are separated two by two by a distance less than 0.5 mm.

According to one possible embodiment, the conductive circuit is inside the resonator. According to another embodiment, the resonator is inside the conductive circuit.

The conductive circuit and the resonator can be deposited on the same flat support.

Alternatively, the conductive circuit is produced in a first plane, the resonator is produced in a second plane different from the first plane, and the resonator is situated in line with the conductive circuit, for example a median turn of the resonator is in line with the conductive circuit to obtain particularly efficient coupling.

For example, the resonant frequency of the resonator alone (or no-load resonator frequency) is at most 10% higher than a communication frequency of the electronic circuit with the exterior devices (for example a contactless reader). Thus the coupling of the conductive circuit involving a resonant frequency of the circuit as a whole slightly lower than the resonant frequency of the resonator alone, the resonant frequency of the circuit as a whole is particularly suitable for profiting from the amplification phenomenon.

The antenna considered here is a magnetic antenna, i.e. an antenna that essentially generates an induction current.

The electronic circuit functions at a frequency of communication with the antenna below 100 MHz, for example.

Said communication frequency can be between 1 MHz and 50 MHz, for instance, in particular between 13 MHz and 15 MHz.

In this latter case, the resonant frequency of the resonator alone can then advantageously be between 13.6 MHz and 17 MHz.

The exterior dimensions of the electronic entity are less than 100 mm, for example, or even less than 30 mm. The invention is particularly beneficial in these conditions where the available area is small.

Under these conditions, the capacitance of the electronic circuit is greater than 100 pF, for example, and/or the resonator comprises more than ten turns, which is particularly propitious for good interaction of the various elements.

The electronic entity can therefore be a pocket electronic entity. It is a microcircuit card, for example. In this case, the antenna can advantageously extend over only around half the area of the card. Other features and advantages of the invention will become apparent in the light of the following description, given with reference to the appended drawings, in which:

FIG. 5 represents a top view of a support carrying an antenna according to a fourth embodiment of the invention;

FIG. 6 represents a bottom view of the support from FIG. 5;

FIG. 7 represents a fifth embodiment of the invention;

FIG. 8 represents an antenna according to a sixth embodiment of the invention;

Figure 1:
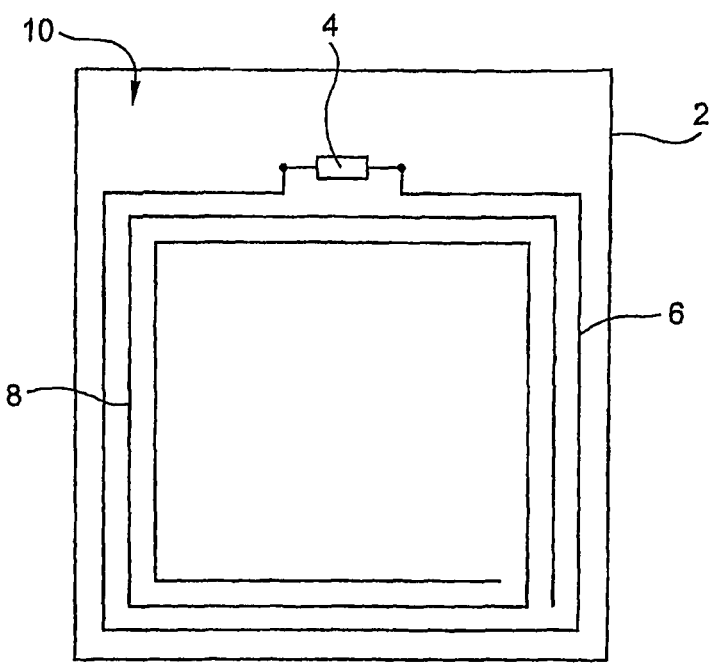
FIG. 1 represents a first example of an electronic entity produced in accordance with the teachings of the invention.

FIG. 1 represents diagrammatically a first example of an electronic entity produced in accordance with the teachings of the invention. Here it is a microcircuit card 2, the elements whereof essential to understanding the invention have been represented, namely an electronic circuit 4 (such as an integrated circuit) to the terminals of which is connected an antenna formed on the one hand by a loop 6 and on the other hand by a resonator 8.

For example, the electronic circuit 4 is received in a module that has just been deposited on the electronic entity 2 in order to make the connection of the electronic circuit 4 to the antenna (here in practice to the loop 6), for example as described in the document FR 2 863 747.

The antenna enables the electronic circuit 4 to communicate at a distance with other electronic devices such as a card reader, for example. The antenna is a magnetic antenna not only for exchange of information between the electronic circuit 4 and the exterior electronic device at a predetermined frequency but also to provide a remote power feed to the electronic circuit 4.

For portable pocket electronic entities of everyday size (namely dimensions of the order of 10 cm or less), which exchange information with a range of the order of 1 meter, or even a few meters, such an antenna functions through a magnetic field (i.e. at a distance at most of the order of the wavelength) at frequencies up to around 100 MHz (at which the wavelength is 3 m).

The electronic entity 2 described here is a contactless type card, for example, which can exchange information with an exterior electronic device, for example according to the ISO standard 14 443, on a 13.56 MHz carrier.

Here the loop 6 is produced by a single turn and therefore forms, as already indicated, a conductive circuit connected at each of its ends to one of the terminals of the electronic circuit 4.

For example, the loop 6 is produced by etching a copper track on a support 10 produced in a dielectric material that constitutes a layer of the electronic entity 2, in particular in the case described here where the electronic entity is a microcircuit card. Other embodiments of the loop 6 can naturally be envisaged, such as depositing a copper wire or a conductive ink, for example.

The resonator 8, also formed here by conductive tracks (for example obtained by etching copper with a width of about 0.15 mm, for example between 0.12 mm and 0.2 mm, and a spacing of about 0.15 mm, for example between 0.12 mm and 0.2 mm), is disposed at a sufficiently small distance from the latter to enable capacitive coupling between these two elements.

In the example represented in FIG. 1, the resonator 8 is formed of rectilinear portions that form a conductive spiral with free ends, formed of two turns in the case described.

One of the turns of the resonator 8 (the exterior turn in FIG. 1) faces the loop 6, over at least a substantial portion of its perimeter (here virtually all the latter), and at a small distance (i.e. less than 0.5 mm and for example less than 0.15 mm) from the latter in order to ensure good capacitive coupling.

Alternatively, the proximity of the turn of the resonator 8 and the loop 6 can take place over only a portion of their perimeter (for example of the order of half of the latter), which ensures sufficient capacity coupling in certain cases.

According to another variant, the capacitive coupling could be produced by connecting the loop 6 and the resonator 8 by means of a capacitor.

The disposition of the resonator 8 in the form of turns generates an inductive behavior of that element, while the proximity of the portions (here rectilinear) of the spiral two by two and the absence of looping (because of the free ends of the spiral) induces a capacitive behavior.

The resonator therefore has a high Q at a resonant frequency.

This Q at resonance will advantageously be used to amplify, at the communication frequency used, the signals to which the resonator is subjected. Those amplified signals are transmitted to the loop by capacitive coupling. To this end, the resonator 8 is designed (in terms of the disposition of these tracks, their width and the spacing between them, and in terms of the materials used for the resonator 8 and the support 10) in order to have inductive and capacitive effects that cause a resonance at a frequency close to the communication frequency of the electronic circuit, as illustrated in the examples described hereinafter.

For the calculation of the values of inductance and capacitance generated for given characteristics of the resonator, see for example the documents "Inductance Calculation Techniques, part II: Calculations and Handbook Methods", by Marc T. Thompson, in Power Control and Intelligent Motion, December 1999, "Design and Optimization of a 10 nH Square-Spiral Inductor for Si RF ICs", by Tuan Huu Bui, University of North Carolina, October 1999, "Capacity Limits and Matching Properties of Integrated Capacitors", by Robert Aparicio and Ali Hajimiri, in IEEE Journal of Solid State Circuits, Vol. 37 No. 3, March 2002, "Interdigital sensors and transducers" by Alexander V. Mamishev et al., in Proceedings of the IEEE, Vol. 92, No. 5, May 2004 and "Be Careful of Self and Mutual Inductance Formulae", by H. Kim and C. C-P. Chen, University of Wisconsin, Madison, 2001.

The use of a plurality of turns in the resonator, as is the case the embodiment of the invention shown in FIG. 1, not only increases the inductive effect by increasing the length of the conductor used, but also the capacitive effect through the cooperation of each rectilinear portion of the resonator 8 with another rectilinear portion of the latter.

Moreover, as for the loop 6, there are numerous possibilities for implementation of the resonator 8 other than the conductive material tracks, for example the use of a copper wire (between 0.088 mm and 0.15 mm wide and with a spacing between 0.112 mm and 0.2 mm) or the deposition of a conductive ink (between 0.15 mm and 0.3 mm wide and with a spacing between 0.3 mm and 0.5 mm).

Finally, although rectilinear portions are imposed on the resonator specified by way of example hereinabove, clearly curved portions could be used instead.

Figure 2:
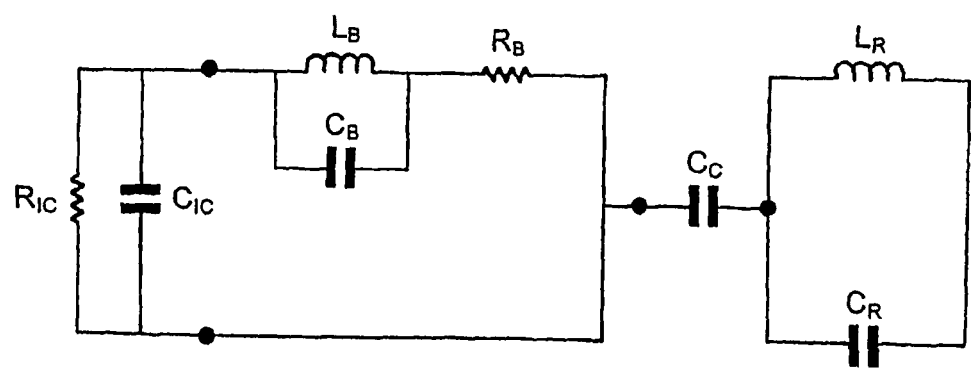
FIG. 2 represents an equivalent electronic circuit for modeling the general principles of the electrical behavior of the electronic entity from FIG. 1.

There is represented in FIG. 2 one possible equivalent electric circuit diagram for modeling the general principles of the electrical behavior of the electronic entity from FIG. 1, which clearly explains the electrical operation of the latter.

The electronic circuit 4 is represented in the standard way by a resistor $R_{IC}$ and a capacitor $C_{IC}$ in parallel. In the case where the electronic circuit is an integrated circuit, this data is generally supplied by the fabricator of the electronic circuit, or can be measured.

The loop 6 is mainly represented by the series combination of an inductor $L_B$ and a resistor $R_B$. To model also cases where the loop 6 is formed of a plurality of turns, there is also provided an inter-turn capacitor $C_B$ connected in parallel with the inductance $L_B$ of the loop 6.

The resonator 8 is represented by an LC circuit that combines an inductor $L_R$ and a capacitor $C_R$ the physical origin of which is explained hereinafter.

As indicated with reference to FIG. 1, the loop 6 and the resonator 8 are associated by capacitive coupling, which is represented in the FIG. 2 equivalent circuit diagram by the connection of the portion representing the loop 6 (primarily inductor $L_B$ and resistor $R_B$) to the portion representing the resonator 8 (inductor $L_R$ and capacitor $C_R$) via a capacitor $C_C$ corresponding to the capacitive coupling.

Figure 3:
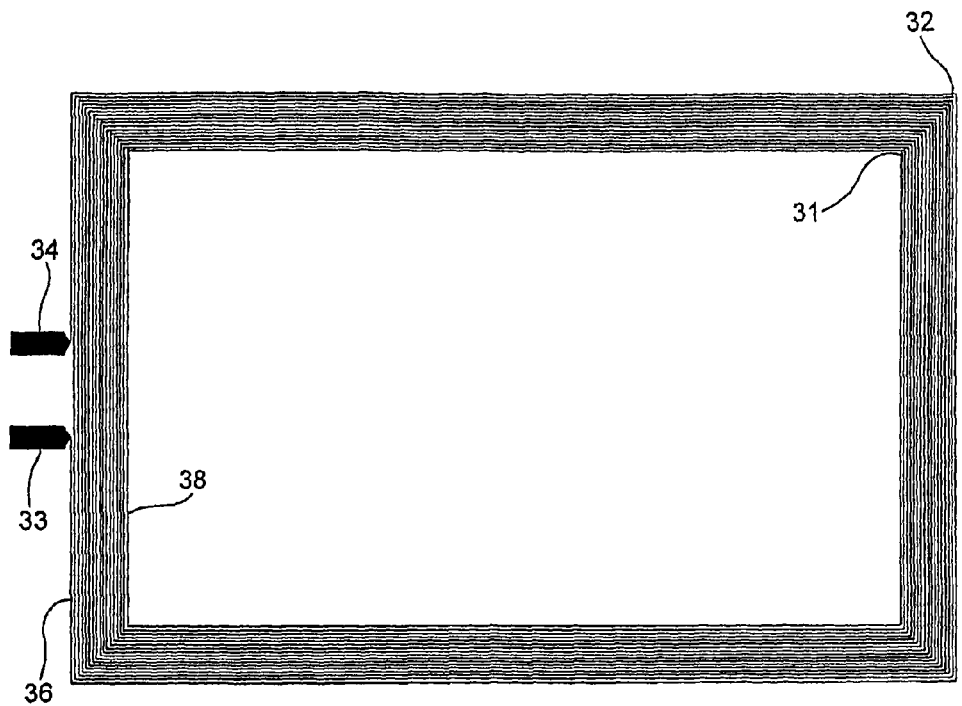
FIG. 3 represents an antenna used in a second embodiment of the invention.

FIG. 3 represents a second example of an antenna conforming to the teachings of the invention, which is naturally associated with an electronic circuit as has already been described with reference to FIG. 1 to form an electronic entity of the microcircuit card type.

This kind of antenna is adapted here to an ID1 type card with dimensions 85.6 mm×54 mm.

The antenna represented in FIG. 3 comprises a loop 36 formed by a single turn (intended to be connected at each of its ends to the electronic circuit) and a resonator 38 formed by about fifteen turns, the winding formed by these turns having free ends 31, 32.

All the elements of the antenna, namely the loop 36 and the resonator 38, are here formed in the same plane, for example by deposition on a support in a dielectric material, for example paper or a plastic material (of relative permittivity between 2 and 7).

The conductive tracks are here produced in copper by etching.

This embodiment, produced here for a card with dimensions 81 mm×50 mm, produces a resonator capacitance CR of 0.6165 pF and a resonator inductance $L_R$ of 219.7 µH, which defines a no-load resonant frequency (i.e. of the resonator alone) of 13.678 MHz. The coupling with the loop having the effect of very slightly reducing the resonant frequency compared to the unloaded resonator, the antenna is particularly beneficial for a microcircuit card whose electronic circuit communicates with the exterior at a frequency of 13.56 MHz (for example a PHILIPS MIFAR PRO X electronic circuit).

The loop 36 is naturally terminated at each end intended to be connected to the electronic circuit by a connection land 33, 34.

Because of the use of a single turn for the loop 36 and a winding with free ends (i.e. with no looping) for the resonator circuit 38, the antenna proposed in FIG. 3 does not necessitate the use of a bridge. However, thanks to the use of the resonator, its magnetic performance is particularly good.

Figure 4:
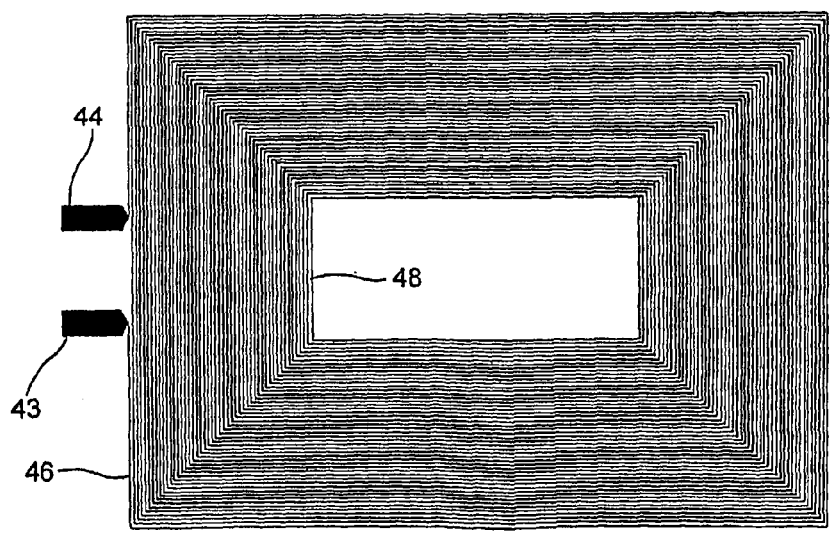
FIG. 4 represents an antenna according to a third embodiment of the invention.

FIG. 4 represents an antenna used in a third embodiment of the invention, of design relatively close to the antenna described with reference to FIG. 3.

Accordingly, as for the antenna described with reference to FIG. 3, the FIG. 4 antenna comprises a loop 46 formed by a single turn provided at its two ends 43, 44 with connecting lands to the electronic circuit.

Inside the area delimited by the loop 46, the antenna comprises a resonator 48 formed by a winding with free ends of about forty turns. Each turn is produced by four rectilinear portions.

The characteristics of the FIG. 4 antenna, intended for a card with dimensions 61 mm×40 mm, produce, as in the previous case, a resonant frequency close to 13.56 MHz. In fact, there are obtained here a resonator inductance $L_R$ of 122.113 µH, a resonator capacitance $C_R$ of 1.11 pF and thus a no-load resonant frequency of 13.653 MHz.

As for the FIG. 3 example, the antenna represented in FIG. 4 does not necessitate the placing of a looping bridge between elements of the antenna circuit.

A fourth embodiment of the invention is described next with reference to FIGS. 5 and 6.

In this embodiment, a support 55 carries on a first face represented in FIG. 5 a loop 56 produced in the form of a single turn with connecting lands 53, 54 at each of its ends for connection with the electronic circuit of the electronic entity considered in this fourth embodiment.

On a second face of the support 55, opposite the first face and represented in FIG. 6, the electronic entity receives a resonator 58 formed of rectilinear portions of conductive tracks that trace out a spiral (here formed with three turns) with free ends 51, 52.

The loop 56 and the resonator 58 are respectively positioned on the first face and the second face of the support 55 so that at least a substantial portion of the length of the loop 56 is located in line with the resonator 58, preferably in line with rectilinear portions of the resonator 58, for example exterior portions of the latter, or alternatively median portions of the latter (which enhances the phenomenon of capacitive coupling between the loop 56 and the resonator 58).

Thus certain portions of the resonator 58 and the loop 56 are separated only by the thickness of the dielectric material support 55 and the disposition that has just been referred to therefore also produces capacitive coupling between the loop 56 and the resonator 58.

If it is required to obtain a particularly efficient coupling, a thin support is used, for example a support less than 0.5 mm thick, even less than 0.3 mm thick, and even less than 0.15 mm thick.

The operation of the electronic entity that uses the antenna described with reference to FIGS. 5 and 6 follows from the same principles already described for the electronic entity of FIG. 1 with reference to FIG. 2.

FIG. 7 represents an antenna in a fifth embodiment of the invention.

That antenna includes a resonator 78 formed of a plurality of turns produced by means of rectilinear conductive track portions. The conductive track that traces out the resonator 78 thus forms a spiral with two free ends 71, 72.

Note here, as is the case in FIG. 7, that the number of turns that form the resonator is not necessarily an integer number, without this compromising the design or the physical operation of the antenna. Moreover, this remark applies equally to the other embodiments.

The interior turn of the resonator (i.e. the turn that terminates at one end in the free end 72) produces an area which, as seen clearly in FIG. 7, receives a loop 76 formed by a single turn intended to be connected to an electronic circuit by means of connecting lands 73, 74 each situated at one end of the turn.

The loop 76 is situated at a sufficiently small distance from the interior turn of the resonator 78 (over at least a portion of their perimeter, and in the example described here over all the perimeter of the turn forming the loop 76) so that capacitive coupling exists between the loop 76 and the resonator 78.

The operation of the antenna according to this fifth embodiment therefore follows from the same principles as for the preceding embodiments that have been explained with reference to FIGS. 1 and 2.

FIG. 8 represents an antenna conforming to a sixth embodiment of the invention.

The antenna represented in FIG. 8 comprises a loop 86 that has at each of its ends a connecting land 83, 84.

The antenna also comprises a resonator 88 situated in the interior area defined by the turn 86.

The resonator is formed by a conductive track parallel to the loop 86 and situated at a small distance from the latter, and is extended on either side in the vicinity of the connecting lands 83, 84 as far as two face-to-face terminals 87, 89, also at a small distance from each other and each formed by a widening of the conductive track that forms the resonator 88.

The two terminals 87, 89 enable the connection of a capacitor the capacitive behavior whereof is added to the inductive behavior of the conductive track of the resonator that approximates a turn. These two conjugate effects produce the resonator effect.

Moreover, because of the proximity of the conductive track that forms the resonator 88 to the loop 86, on the one hand, and the connecting lands 83, 84, on the other hand, capacitive coupling exists between the loop 86 and the resonator 88.

The sixth embodiment therefore operates according to the same principles as the embodiments described hereinabove.

The embodiment described with reference to FIG. 8 achieves the following electrical characteristics for a card with dimensions 23.6 mm×20.4 mm by associating with the resonator a 1325 pF capacitor: resonator inductance 104.4 nH and therefore a no-load resonator frequency of 13.625 MHz.

Figure 9:
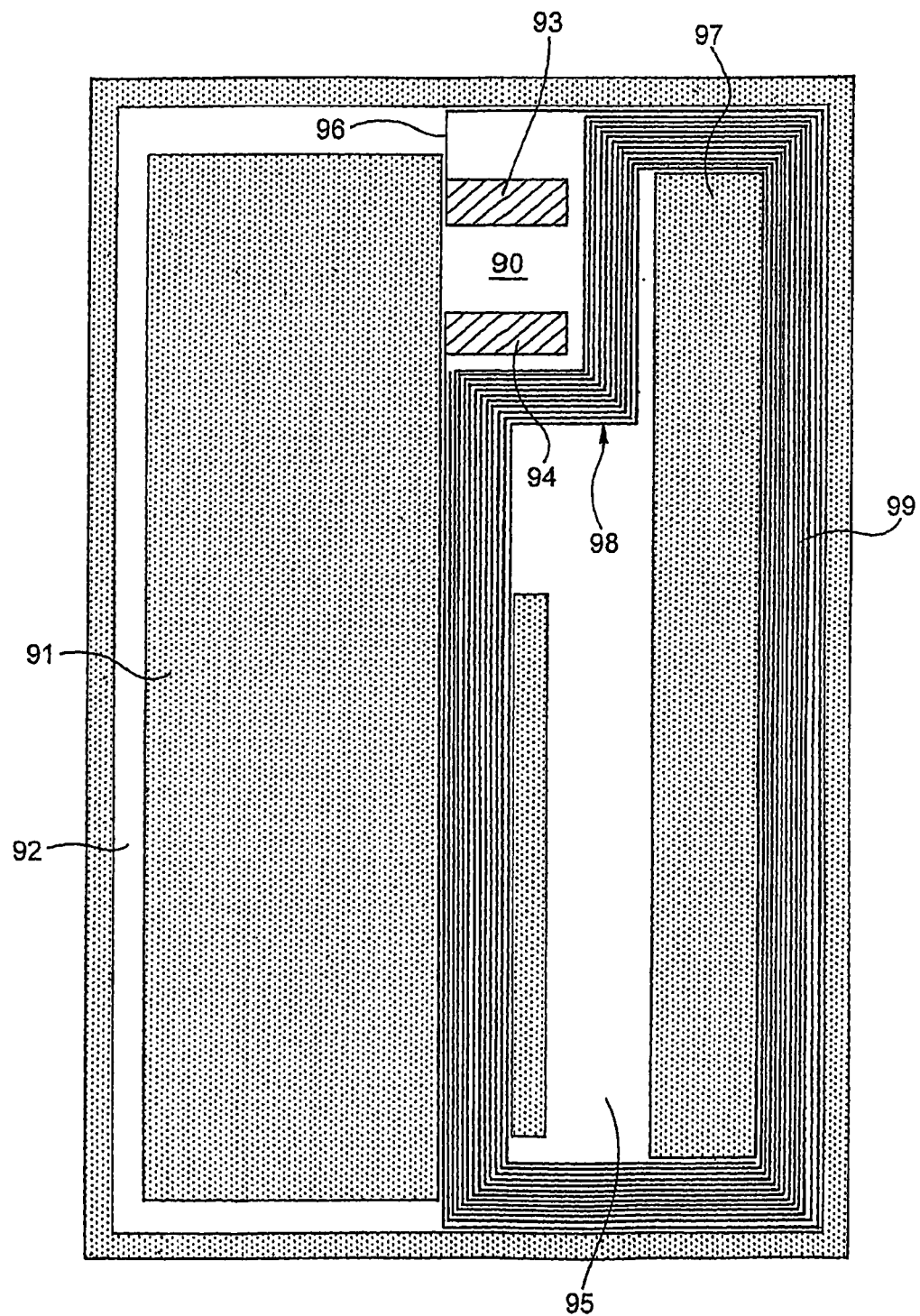
FIG. 9 represents an antenna according to a seventh embodiment of the invention.

FIG. 9 represents a bank card in which is implanted an antenna according to a seventh embodiment of the invention.

The card diagrammatically represented in FIG. 9 is an ID1 type card with dimensions 85.6 mm×54 mm.

FIG. 9 indicates areas of the card in which it is possible to implant electrical and electronic circuits (including an antenna of the microcircuit of the card for communication with the exterior) and the areas in which such implantation is impossible, for example because of mechanical loads subsequent to the assembly of the various layers of the card (typically by lamination), such as the embossing intended to produce inscriptions on the card.

Thus the card comprises in its vertical half represented on the left in FIG. 9 an embossing area 91 (in which implantation of the antenna is impossible) with dimensions that are large relative to the totality of this half, and which therefore leaves only a narrow area 92 for implantation of the antenna.

In its vertical half situated on the right in FIG. 9, the magnetic stripe that the card must carry defines a corresponding area 97 in which it is preferable to limit the implantation of electrical circuits.

This area corresponding to the magnetic stripe 97 nevertheless leaves, on either side, regions with relatively large dimensions where the implantation of electrical and electronic circuits is possible, namely a region 99 of elongate shape situated between the area corresponding to the magnetic stripe 97 and the right-hand edge of the card, and a main area 95 situated between the embossing area 91 and the area corresponding to the magnetic stripe 97.

Note that a small portion of the main area 95 cannot receive implanted electrical circuits as represented in FIG. 9. However, because of its small dimensions, this area does not call into question the explanations given hereinafter.

Note also that the main area 95 comprises an area 90 for implantation of the electronic circuit of the card.

When it is required to obtain a sufficient range for the ID1 card that has just been described, it is impossible to use the narrow area 92 because the latter can receive only a limited number of turns.

One is therefore constrained to implant the antenna in the vertical half (represented on the right in FIG. 9) that does not contain the embossing area 91, which nevertheless involves dividing the area of the antenna by two, and consequently, with the standard design, division by two of the magnetic flux used for telecommunication purposes.

It is proposed here, as seen in FIG. 9, to implant a loop 96 the perimeter of which approximately corresponds to that of the vertical half represented on the left in FIG. 9. The loop 96 therefore lies primarily in the main area 95 and, to a lesser degree, in the region 99 of elongate shape.

The loop 96 comprises a single turn connected at its two ends to the electronic circuit of the card by means of connecting lands 93, 94 that naturally lie in the implantation area 90.

It is further proposed to implant a resonator 98 in the interior of the loop 96.

The resonator is formed of rectilinear conductive track portions that form a spiral winding with free ends.

Just like the loop 96, the resonator 98 extends primarily over the area of the main regions 95 and the region 99 of elongate shape.

Here the resonator 98 is obtained by spiral winding conductive wires 0.112 mm wide with an interturn width of 0.088 mm.

The resonator 98 therefore amplifies signals at the communication frequency of the electronic circuit (here 13.56 MHz), the signals being further exchanged between the resonator 98 and the loop 96 by capacitive coupling between these two elements, as already described for the preceding embodiments.

Although the exterior dimensions of the antenna (namely the loop 96 here) are small (here slightly less than half the area of the ID1 card), sufficient sensitivity of the antenna is nevertheless obtained, and thus a sufficient range of the card in remote operation.

Figure 10:
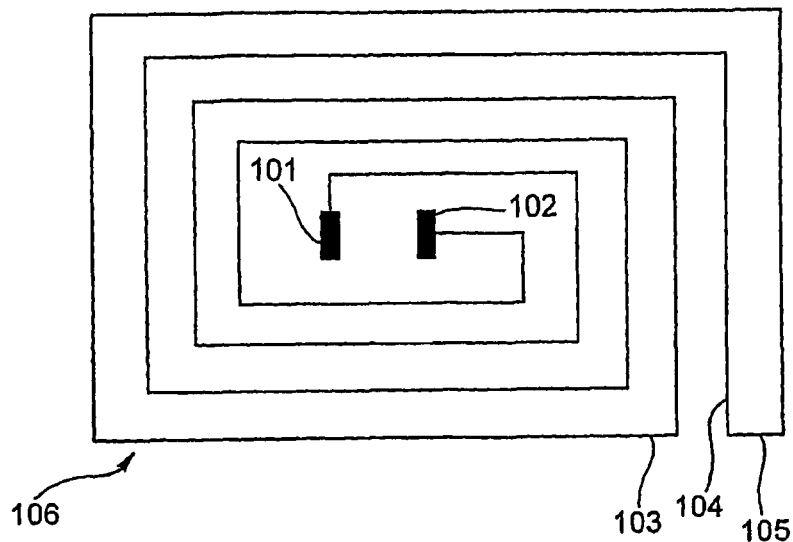
FIG. 10 represents an antenna according to an eighth embodiment of the invention.

FIG. 10 represents an antenna according to an eighth embodiment of the invention. This antenna is formed by a loop 106 intended to be connected by means of first and second connecting lands 101, 102 to the electronic circuit of the entity concerned.

The loop 106 comprises a first strand 103, called the exterior strand, which extends in a spiral from the first connecting land 101. As can be seen in FIG. 10, the exterior strand 103 extends over more than two turns (here over about 800°) around the first connecting land 101 and therefore on its own forms a plurality of turns (here more than two turns).

The loop 106 also comprises a second strand 104, called the interior strand, which extends in a spiral from the second connecting land 102, parallel at each point to the exterior strand 103 and inside the latter, so that the exterior strand 103 and the interior strand 104 form two interlaced spirals.

The interior strand 104 extends over about two turns (i.e. 720°) relative to the second connecting land 102 and around the latter.

The interior strand 104 and the exterior strand 103, which are parallel to each other at each point along their length, are connected together, at their ends opposite their respective connecting land, by means of a connecting portion 105.

The loop 106 therefore forms a continuous conductive circuit which, although it lies in a plane, includes a plurality of turns (for each of the strands); this conductive circuit therefore extends over more than one turn (360°), here even over more than two turns for each strand.

In the embodiment represented in FIG. 10, the strands are formed by a set of rectilinear portions that form a spiral winding sometimes called a "square spiral". Alternatively, it could naturally be a question of curved portions.

As can be seen clearly in FIG. 10, the two strands 103, 104 are separated by a distance of the same order of magnitude over all their length, and essentially constant in each direction (and which here corresponds, in one direction, to the distance separating the connecting lands 101, 102 and to the length of the connecting portion 105) enabling the loop 106 to be distributed over most of the area of the electronic entity (for example a microcircuit card) that receives it. This particular disposition produces a low interturn capacitance and a sufficient internal area of the loop 106.

To guarantee optimum operation without significant capacitive coupling between the interior strand 104 and the exterior strand 103, they are separated by a minimum distance of 8 mm, which is beneficial in particular for a frequency of the order of 13.56 MHz (in practice between 1 MHz and 50 MHz).

Because of the use of more than on turn (even a plurality of turns) for each of the strands, the performance of the antenna is good. It has in fact been noted with regard to the efficiency of the antenna that, in particular because of the mutual inductance created between the strands, phenomena linked to the presence of the turns that each strand constitutes dominate over those linked to the area delimited by the two strands.

Figure 11:
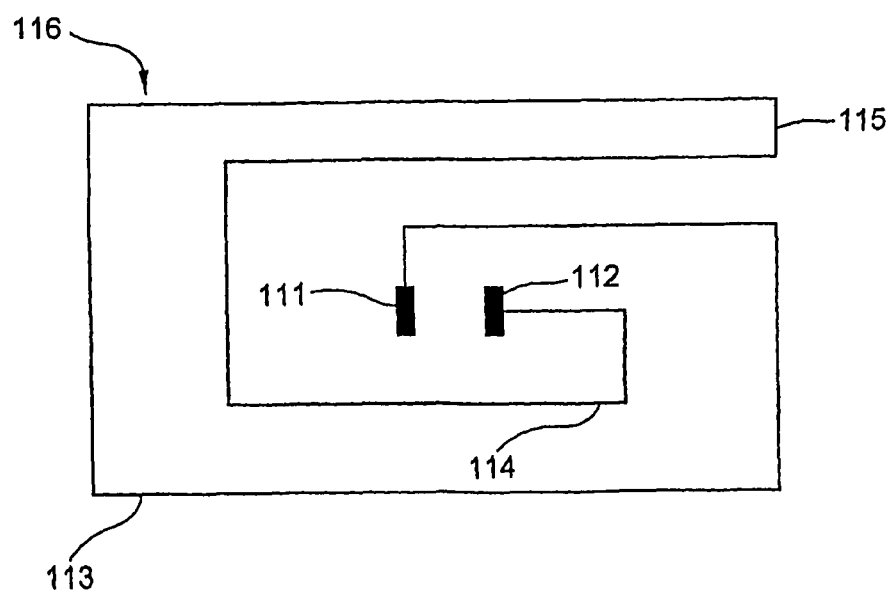
FIG. 11 represents an antenna according to a ninth embodiment of the invention.

FIG. 11 represents a ninth embodiment of an antenna according to the invention, which constitutes a variant of the antenna represented in FIG. 10.

In fact, this ninth embodiment of the antenna consists of a loop 116 that comprises an exterior strand 113 that extends in a spiral from a first connecting land 111 and an interior strand 114 that extends in a spiral from a second connecting land 112 and inside the exterior strand 113.

The exterior strand 113 extends over more than one turn (i.e. over more than 360°) relative to the first connecting land 111, i.e. according to a geometrical approach each ray coming from the first connecting land 111 intersects the exterior strand 113 at one point at least; it therefore forms on its own a winding that extends over more than one turn.

The exterior strand 113 and the interior strand 114 are connected at their end opposite their respective connecting land 111, 112, by a connecting portion 115 so that the loop 116 forms a continuous conductive circuit.

The loop 116, although it forms a continuous circuit a portion of which forms a turn that extends over more than 360°, is produced in the same plane and therefore forms, once the connecting lands are connected by the electronic circuit, a circuit with no intersections in projection in this plane. This antenna can therefore be produced in a single layer of the electronic entity, without necessitating a circuit looping bridge.

Figures 12, 13:
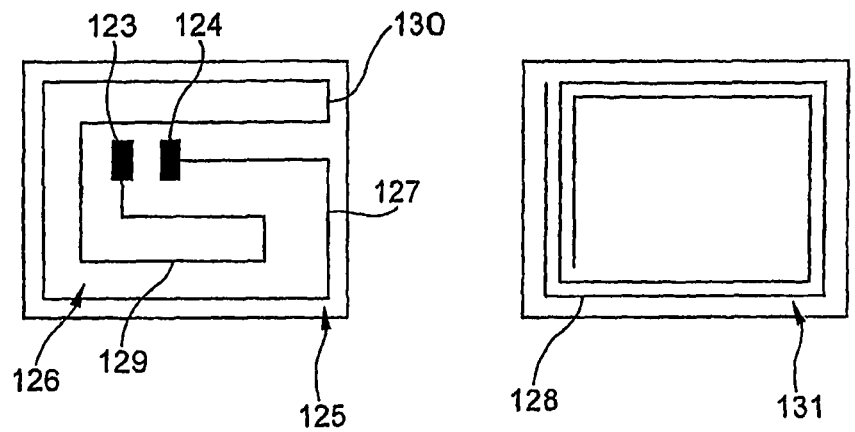
FIG. 12 represents a first portion of an antenna according to a tenth embodiment of the invention.
FIG. 13 represents a second portion of the antenna in the tenth embodiment of the invention.

FIGS. 12 and 13 represent an antenna produced inside a microcircuit card on two layers of that card respectively represented in FIGS. 12 and 13.

There is deposited on a first layer 125 of the microcircuit card a loop 126 adapted to be connected to the electronic circuit of the card by means of connecting lands 123, 124 situated substantially at the center of the area of the first layer 125.

From the connecting land 124 extends in a spiral a first strand 127 of the loop 126, referred to hereinafter as the exterior strand. The exterior strand 127 comprises a rectilinear portion that extends essentially between the connecting land 124 and an edge of the card and four rectilinear portions that extend over virtually all the perimeter of the card, at a small distance from the edge of the latter.

The second strand 129 of the loop 126 extends in a spiral from the connecting land 123, inside the spiral formed by the exterior strand 127. Because of this the second strand 129 is referred to as the interior strand.

The exterior strand 127 and the interior strand 129 are connected to each other at their ends opposite the connecting land 123, 124 by a connecting portion 130. The loop 126 is therefore able to form, with the electronic circuit of the card, a closed circuit.

Note that the various spacings between the various conductive track portions forming the loop 126 (i.e. the spacing between the two strands) are (taken two by two) of the same order of magnitude, and substantially equal two by two in each direction, in order on the one hand to limit the formation of interturn capacitances and, on the other hand, to provide a sufficient area inside the loop 126.

On a second layer 131 represented in FIG. 13 the microcircuit card carries a resonator 128 formed of the spiral winding of a conductive track with free ends (formed here of a little more than two turns).

The first layer 125 and the second layer 131 are sufficiently close for capacitive coupling to exist between the resonator 128 and the loop 126 and in particular its exterior strand 127 which in the example given here is disposed substantially in line with the turns that form the resonator 128.

There is obtained in this way operation of the type described in principle with reference to FIGS. 1 and 2.

Figure 14:
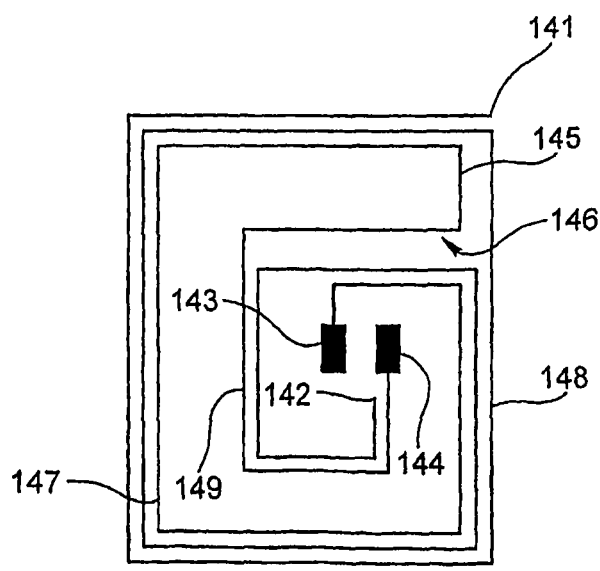
FIG. 14 represents an antenna according to an eleventh embodiment of the invention.

FIG. 14 represents an antenna used in an eleventh embodiment of the invention.

This antenna comprises a loop 146 formed of an exterior strand 147 and an interior strand 149.

Each strand 147, 149 extends in a spiral from a connecting land 143, 144 situated substantially at the center of the card.

The exterior strand 147 is formed by a spiral that extends in particular over virtually all the perimeter of the card (generally more than ¾ of that perimeter, and here more than ⅞ of that perimeter). Because of this in particular, the exterior strand 147 extends, as seen from the connecting land 143, over more than one turn (i.e. over more than 360°). In other words, any (imaginary) ray originating from the connecting land 143 has at least one intersection with the exterior strand 147.

The interior strand 149 extends in a spiral from the connecting land 144 and inside the area delimited by the exterior strand 147, so that it is interlaced with the exterior strand 147.

The exterior strand 147 and the interior strand 149 are connected, at their end opposite their respective connecting land 143, 144, by a connecting portion 145 and thus form a plane closed circuit when the electronic circuit is connected to the connecting lands 143, 144.

The antenna also comprises a resonator 148 formed by a spiral wound conductive track with free ends 141, 142.

The resonator 148 comprises about two turns wound around the loop 146, one turn of which is at a small distance from the exterior strand 147 of the loop 146 over virtually all the perimeter of the card. The resonator 148 also comprises a second portion electrically connected to the first and which is wound in a spiral inside the loop 146, partly in the vicinity of the exterior strand 147 and partly in the vicinity of the interior strand 149, almost as far as the connecting land of the latter.

The proximity of the resonator 148 and the loop 146 over an important portion of the length of the loop 146 enables capacitive coupling between the resonator 148 and the loop 146 and therefore operation as already given in principle with reference to FIGS. 1 and 2.

The examples that have just been given naturally represent only possible embodiments of the invention.

The electronic entity can in particular be other than a microcircuit card, such as a personal digital assistant or an electronic passport, for example.

The invention claimed is:

1. An electronic entity comprising an electronic circuit and an antenna at least a portion of which forms a conductive circuit connected to two ends of the electronic circuit,
   wherein the projection of the conductive circuit formed by the antenna and the electronic circuit on a plane that is substantially parallel to the conductive circuit forms a line with no intersections and in that the antenna comprises a winding that extends over strictly more than one turn,
   wherein the antenna is a magnetic antenna configured to operate by inductive coupling.

2. The electronic entity according to claim 1, wherein the winding forms a plurality of turns.

3. The electronic entity according to claim 1, wherein the conductive circuit includes said winding.

4. The electronic entity according to claim 1, wherein the conductive circuit comprises a first strand and a second strand each forming a spiral, the first strand and the second strand being interlaced.

5. The electronic entity according to claim 4, wherein the second strand is essentially parallel at each point to the first strand.

6. The electronic entity according to claim 4, wherein the first strand and the second strand are separated by a distance of the same order of magnitude over all their length and essentially constant in each direction.

7. The electronic entity according to claim 5, wherein the first strand and the second strand are separated by at least 8 mm.

8. The electronic entity according to claim 5, wherein the first strand is connected to a first connecting land, wherein the second strand is connected to a second connecting land, and wherein the first strand and the second strand are connected by a connecting portion.

9. The electronic entity according to claim 8, wherein at least one of said connecting lands is situated in a central region of the antenna.

10. The electronic entity according to claim 1, wherein the antenna comprises a resonator coupled to the conductive circuit.

11. The electronic entity according to claim 10, wherein the electrical conductor is formed of a single turn.

12. The electronic entity according to claim 10, wherein the resonator is capacitively coupled to the conductive circuit.

13. The electronic entity according to claim 12, wherein the resonator comprises a turn facing the conductive circuit over at a least a portion of its perimeter.

14. The electronic entity according to claim 13, wherein the turn of the resonator faces the conductive circuit over virtually all its perimeter.

15. The electronic entity according to claim 13, wherein the turn of the resonator and the conductive circuit are at a distance less than 0.5 mm over said perimeter portion.

16. The electronic entity according to claim 10, wherein the resonator is formed of a conductive winding with free ends.

17. The electronic entity according to claim 16, wherein the conductive circuit is inside the resonator.

18. The electronic entity according to claim 10, wherein the resonator is inside the conductive circuit.

19. The electronic entity according to claim 10, wherein the conductive circuit and the resonator are deposited on a same flat support.

20. The electronic entity according to claim 10, wherein the conductive circuit is produced in a first plane, wherein the resonator is produced in a second plane different from the first plane, and wherein the resonator is in line with the conductive circuit.

21. The electronic entity according to claim 20, wherein a median turn of the resonator is in line with the conductive circuit.

22. The electronic entity according to claim 10, wherein the resonant frequency of the resonator alone is at most 10% higher than a communication frequency of the electronic circuit.

23. The electronic entity according to claim 10, wherein the resonant frequency of the resonator alone is between 13.6 MHz and 17 MHz.

24. The electronic entity according to claim 1, the electronic entity having exterior dimensions less than 100 mm.

25. The electronic entity according to claim 24, wherein a capacitance of the electronic circuit is greater than 100 pF.

26. The electronic entity according to claim 24, wherein said exterior dimensions are less than 30 mm.

27. The electronic entity according to claim 1, wherein the electronic entity is a pocket electronic entity.

28. The electronic entity according to claim 1, wherein the electronic entity is a microcircuit card.

29. The electronic entity according to claim 28, wherein the antenna extends over about half the area of the card.

30. An electronic entity comprising:
   an electronic circuit; and
   an antenna at least a portion of which forms a conductive circuit connected to two ends of the electronic circuit,
   wherein the projection of the conductive circuit formed by the antenna and the electronic circuit on a plane that is substantially parallel to the conductive circuit forms a line with no intersections and in that the antenna comprises a winding that extends over strictly more than one turn,
   the antenna comprises a resonator coupled to the conductive circuit, the resonator is formed of a conductive winding, and said conductive winding comprises a plurality of turns.

31. The electronic entity according to claim 30, wherein the turns are separated by a distance less than 0.5 mm.

32. An electronic entity comprising an electronic circuit and an antenna at least a portion of which forms a conductive circuit connected to two ends of the electronic circuit,
wherein the projection of the conductive circuit formed by the antenna and the electronic circuit on a plane that is substantially parallel to the conductive circuit forms a line with no intersections and in that the antenna comprises a winding that extends over strictly more than one turn,
wherein the electronic circuit operates at a communication frequency below 100 MHz, and
the electronic entity having exterior dimensions less than 100 mm.

33. The electronic entity according to claim 32, wherein said communication frequency is between 1 MHz and 50 MHz.

34. The electronic entity according to claim 33, wherein the communication frequency is between 13 MHz and 15 MHz.

* * * * *

UNITED STATES PATENT AND TRADEMARK OFFICE
CERTIFICATE OF CORRECTION

PATENT NO. : 8,698,690 B2
APPLICATION NO. : 11/920969
DATED : April 15, 2014
INVENTOR(S) : Yves Eray It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Twenty-ninth Day of September, 2015

Michelle K. Lee
*Director of the United States Patent and Trademark Office*